United States Patent [19]

Marnet et al.

[11] Patent Number: 4,670,221

[45] Date of Patent: Jun. 2, 1987

[54] APPARATUS FOR NEUTRALIZATION OF ACIDIC POLLUTANTS IN FLUE GASES

[75] Inventors: Crysanth Marnet; Borchert Kassebohm, both of Düsseldorf, Fed. Rep. of Germany

[73] Assignee: Stadtwerke Düsseldorf AG, Düsseldorf, Fed. Rep. of Germany

[21] Appl. No.: 702,457

[22] Filed: Feb. 19, 1985

Related U.S. Application Data

[63] Continuation of Ser. No. 89,258, Oct. 29, 1979, abandoned.

[30] Foreign Application Priority Data

Nov. 2, 1978 [DE] Fed. Rep. of Germany ....... 2847591

[51] Int. Cl.[4] ............................................. B01D 47/00
[52] U.S. Cl. ..................................... 422/107; 422/111; 422/168; 423/210; 423/244; 261/118; 239/118; 239/135; 239/587; 55/18; 55/225; 55/230; 55/227
[58] Field of Search ........................ 422/107, 111, 168; 423/210 R, 242 A, 244 A; 55/18, 225, 227, 230, 263; 261/118; 239/118, 135, 587, 426, 434

[56] References Cited

U.S. PATENT DOCUMENTS

| | | | |
|---|---|---|---|
| 469,114 | 2/1892 | Howard | 239/426 |
| 985,963 | 3/1911 | Zellweger | 55/227 |
| 1,246,355 | 11/1917 | Thomas | 55/230 |
| 1,564,343 | 12/1925 | Gibson | 239/426 |
| 1,911,603 | 5/1933 | Brever | 239/426 |
| 2,311,018 | 2/1943 | Bahson, Jr. | 239/118 |
| 4,070,424 | 1/1978 | Olson et al. | 239/135 |
| 4,083,932 | 4/1978 | Muraco et al. | 423/242 A |
| 4,208,381 | 6/1980 | Isahaya et al. | 422/111 |
| 4,208,383 | 6/1980 | Kisters et al. | 423/242 A |

Primary Examiner—David L. Lacey
Attorney, Agent, or Firm—Toren, McGeady & Associates

[57] ABSTRACT

Apparatus for neutralization of acidic pollutants in flue gas contained in a flue gas channel comprising a flue gas channel for containing a flue gas, a suspension feed pipe having a delivery opening and being connected to apparatus for preparing and maintaining an erosive suspension of a finely divided basically reaction solid in a liquid for introducing suspension as such into the flue gas channel, a compressed gas pipe having a gas discharge opening, said opening being positioned to discharge gas so as to atomize the suspension after it has exited the delivery opening, a device for determining the amount of flue gas flowing through the channel and the amount of pollutants therein and apparatus for simultaneously and separately controlling the amount of suspension introduced and the concentration of said suspension and the amount of compressed gas used depending on the determined amount of flue gas, pollutants, or flue gas and pollutants in the flue gas channel.

13 Claims, 5 Drawing Figures

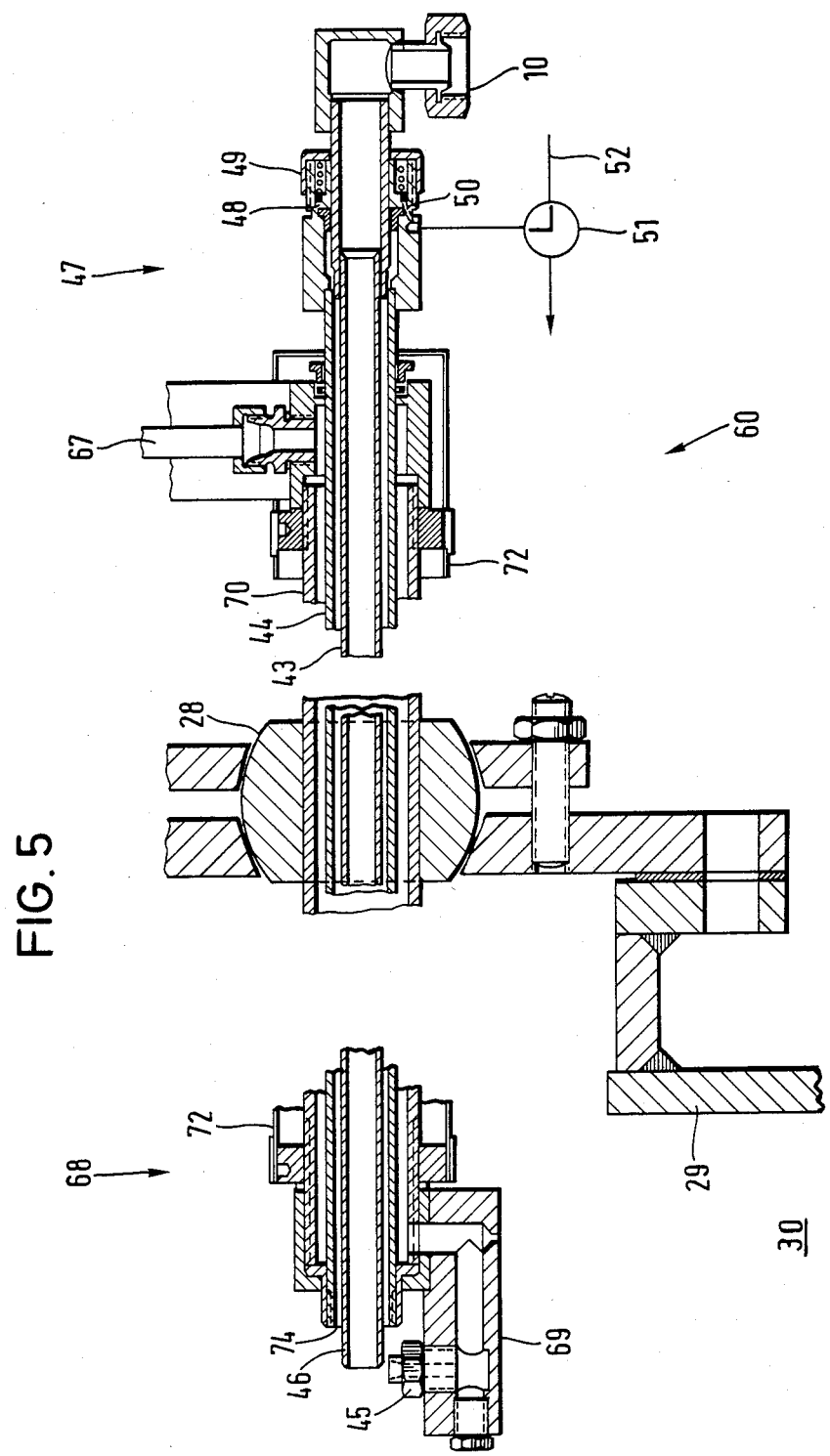

APPARATUS FOR NEUTRALIZATION OF ACIDIC POLLUTANTS IN FLUE GASES

This is a continuation application Ser. No. 089,258, filed Oct. 29, 1979, now abandoned.

BACKGROUND OF THE INVENTION

1. Field of the Invention

The invention relates to a process and equipment for the neutralization and precipitation of acidic or acid-containing pollutants in flue gases of furnaces, especially from incinerating plants, with utilization of the heat from the furnace.

2. Description of the Prior Art

In order to neutralize acidic or acid-containing pollutants in flue gases of furnaces, the conventional methods involve using neutralizing agents, for example, aqueous suspensions of lime, which are sprayed continuously into the flue gases by means of pump-driven liquid atomizers. By this process, the pollutants are transformed into neutral salts while the carrier solution which is introduced with the suspension is dried at the same time. The neutral salts, together with the flue dust are then removed from the flue gas in a dust separator.

In such processes, the neutralization has been carried out at flue gas temperatures higher than 500° C., so that considering the temperature limit imposed by the dew point, a cooling span of about 350° K. is available. This large cooling span permits the introduction of a relatively large amount of liquid in the form of a suspension of very low viscosity. This is advantageous with respect to obtaining a fine dispersion in the flue gas which, in turn, aids the chemical reaction.

If, however, flue gases are supplied from plants which utilize the waste heat, the flue gas temperatures are only about 200° to 250° C. and therefore, a cooling span of only about 100° K. is available for this process. If the furnace is an incinerator in which heterogeneous fuel is processed, great fluctuations in both the amount of flue gas produced and the concentration of pollutants occur. In order to ensure the desired reduction in pollutants even at high concentrations of pollutants, the neutralizing agent is in each case metered out in amounts corresponding to the highest amouht and concentration of flue gas. This naturally requires a high consumption of neutralizing agent. On the other hand, the amount of water, introduced in the case of such an inflexible system is based on the smallest amount of flue gas production which occurs.

SUMMARY OF THE INVENTION

We have discovered a process for neutralizing the acidic or acid-containing pollutants in flue gases in which the neutral salts are precipitated in the dry state and which operates at low flue gas temperatures obtained from plants which utilize the waste heat. We have further discovered an apparatus for maximizing the economy of carrying out this process, particularly with respect to the wear and tear on the plant and consumption of the neutralizing agent.

The process of the present invention involves the dispersion of a viscous suspension of a finely divided basically reacting solid in water with a mixing ratio (solids to liquid) of between 1:20 and 1:2, preferably 1:6 and 1:3, in the flue gas by using a gaseous atomizing agent. Because such a viscous suspension is used, the flue gases undergo relatively little cooling so that neutralization and drying of the neutralization products can take place even at flue-gas temperatures of 200° to 250° C. without reaching the dew point. Additionally, the use of a gaseous atomizing permits the suspension to be transported through the feed lines without high pump pressures and at a low speed. As a result, the suspension which is very erosive, causes minimal wear, particularly in those components responsible for the quality of the atomization.

The amount of suspension used is such that, by utilizing the residual heat of the flue gas, a dry neutral gas is formed. The neutral salt is removed with the flue dust and separated from the flue gas by conventional means.

The present invention also comprises an apparatus for carrying out the above process which comprises means for preparing and maintaining a suspension of a basically reacting solid in a liquid; means for delivering the suspension to the interior of a flue gas channel; means for atomizing said delivered suspension into a spray using an atomizing agent; means for determining the amount of flue gas flowing through said channel and the amount of pollutants therein; and means for simultaneously controlling the amount of suspension delivered to said interior, the concentration of said suspension and the density of said suspension depending on the determined amount of flue gas and or pollutants in said channel.

BRIEF DESCRIPTION OF THE DRAWINGS

FIG. 5 shows a cross-section of an atomizing organ of the equipment of FIG. 4.

DESCRIPTION OF THE PREFERRED EMBODIMENTS

Figure 1:
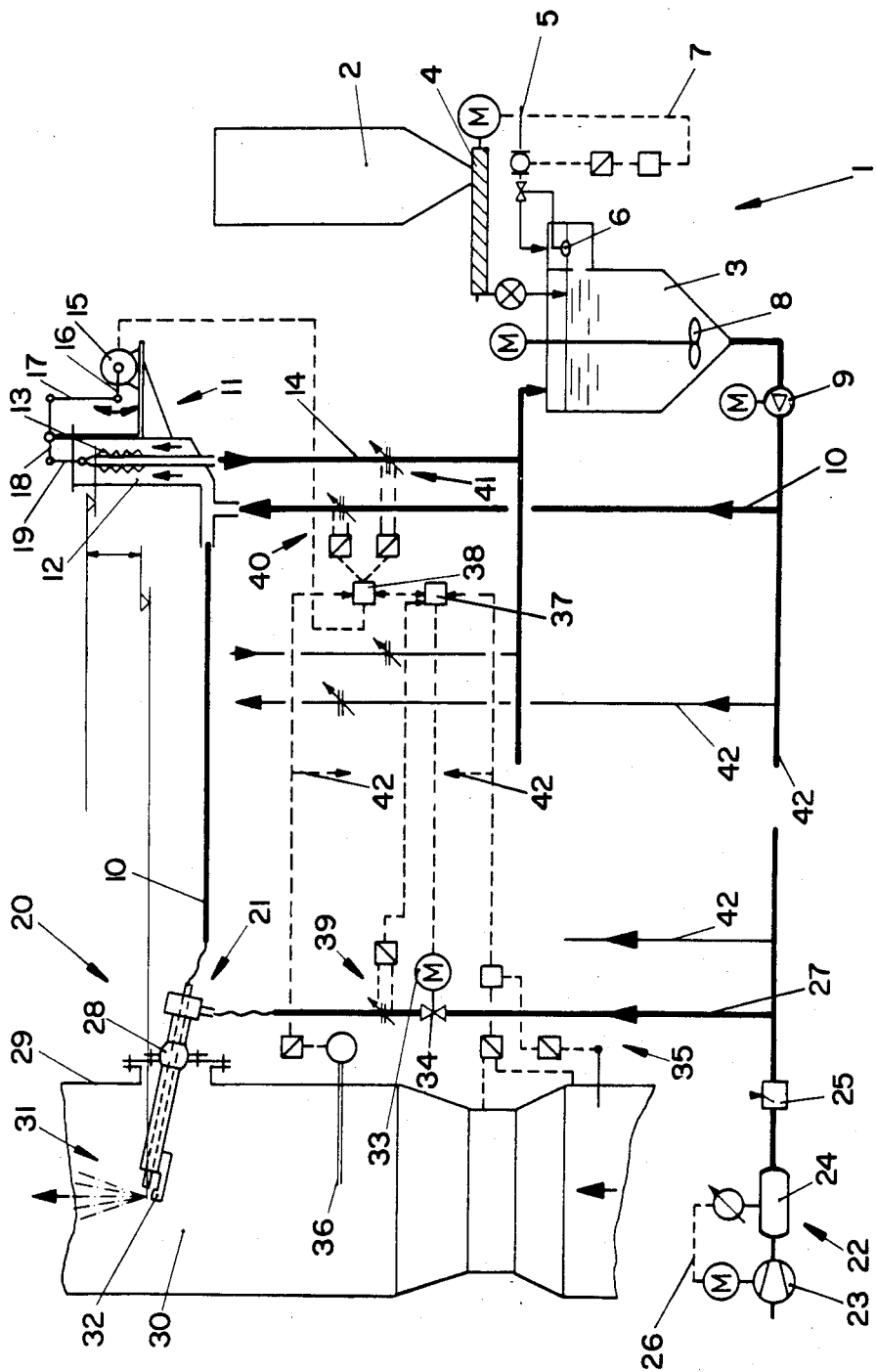
FIG. 1 shows a process engineering flow diagram of equipment for neutralizing pollutants in flue gases in which locally produced compressed air is used as the atomizing agent and calcium hydroxide as the neutralizing agent.

In one embodiment of the present invention, the amount of suspension and/or of the atomizing agent is adjusted according to changes in the amount of flue gas and/or pollutants therein so as to achieve an approximately stoichiometric neutralization process. As a result, the process is particularly suitable for furnaces in which the amount and atmosphere of the flue gases change constantly, as is the case with incinerating plants. In this manner, the consumption of the neutralizing agent and the atomizing agent can be minimized, thereby making the process more economical.

This adjustment is carried out so that as the amount of flue gas changes, the amount of suspension introduced, as well as that of the atomizing agent are correspondingly changed. If there is a change only in the concentration of the pollutant, only the amount of suspension is changed.

In another aspect of the present invention, the suspension is introduced approximately pressureless into the flue gas and then is atomized. As a result, erosive changes in the neutralizing component which are essential for keeping the quality of the atomization constant, are practically excluded.

The apparatus of the present invention utilizes a compressed gas atomizer, for example, a compressed air atomizer or a steam atomizer to produce the atomized spray of the neutralizing agent. This compressed gas atomizer is particularly suitable for dispersing a viscous suspension in a flue gas, because the suspension may then be transported relatively slowly in the pipe lines leading to the furnace channel containing the flue gases so that there is hardly any wear or erosion of these lines. Moreover, dispersion of the suspension in the flue gas in an extremely finely divided state can be achieved better and more easily with a compressed gas atomizer which increases the economic efficiency of the equipment.

The compressed gas atomizer may consist essentially of a compressor and at least one atomizing organ in a section of the flue gas channel behind the furnace, the section being designed as a contact area. Depending on the cross-section of the contact area, there may, however, also be several atomizing organs in one plane and/or in different planes at an appropriate distance from one another.

In accordance with a further characteristic of the invention, the atomizing device is composed of a feed pipe having a delivery opening or nozzle for delivering the suspension into the flue gas and a compressed gas pipe whose outlet discharges in front of the delivery opening of the feed pipe, i.e., so that the compressed gas exiting the gas pipe contacts the suspension just after the suspension exits the delivery opening. Thus, the outlet of the compressed gas pipe should be directed onto the delivery opening or nozzle of the feed pipe in such a manner that the suspension is taken hold of by the exiting gas only after the outlet in order to avoid any erosive phenomena. The outlet of the compressed gas pipe preferably is at right angles to that of the feed pipe.

In yet a further development of the apparatus of the present invention, the compressed air pipe is designed as a jacket pipe which is arranged concentrically about the feed pipe and to whose end a U-shaped section of line is attached, i.e., the end nearest the delivery opening. This results in a very compact construction, in which the atomizing agent acts as an insulator simultaneously keeping the temperatures of the flue gas from affecting the neutralizing agent and, by planned heating, preventing the temperature at the outer pipe from falling below the dew point when a cold, compressed gas, for example, compressed air, is used. When steam is used, shielding of the flue gas on the one hand and of the neutralizing agent on the other, is achieved by an additional pipe which is arranged concentrically and forms an air gap.

In another embodiment of the present invention, the feed pipe, in the area of the outlet end, i.e., the delivery opening, is constructed so as to be axially movable within a wiper ring. By the back and forth movement of the feed pipe, deposits in the area of the outlet end can be wiped off, so that the atomizing geometry, and consequently, the atomizing quality are maintained. The axial motion may be accomplished by means of an activating piston which can be moved in a cylinder and which is connected with the feed pipe and one side of which is acted upon by a pressure medium against the action of a spring. The periodic application of pressure can be achieved by means of an automatic time switch and a two-way magnetic valve connected with the gas compressor can be used.

According to a further characteristic of the invention, the atomizing organ can have a ball-and-socket mounting for the installation in the wall of the contact area. This enables the direction of the jet to be adjusted optimally to the conditions of the flue gas flow.

Also, provision can be made for heating the compressed gas when compressed air is used. Such heating enables the operation to be carried out in winter and also can be used to avoid the cooling to the dew point region which can result in deposits and corrosion on the flue gas side of the atomizing organ.

The invention moreover provides for the compressed atomizer to be equipped with a device for adjusting the amount of compressed gas, which enables the amount of atomizing medium brought in to be adjusted to the respective amount of flue gas. Moreover, the equipment should have a device for varying the amount of suspension delivery corresponding to changes in the amount of pollutants, irrespective of whether these changes result from a change in the amount of flue gas or in the concentration of the pollutants in order to achieve an almost stoichiometric neutralization process.

For automation of this means for adjusting the relative amounts of compressed gas and suspension, the apparatus has means for measuring the amount of flue gas, means for measuring the concentration of pollutants therein, each of which is connected via a control means with means for altering the amount of compressed air and with means for altering the amount of suspension in such a manner that, as the amount of flue gas varies, there is a corresponding change in the amount of compressed gas as well as in the amount of suspension. When only the concentration of the pollutants varies, there is a corresponding change only in the amount of the suspension, and when the amount of flue gas as well as the concentration of pollutants vary, there is a corresponding proportionate change in the amount of the compressed gas and of the suspension supplied. This assures an optimally low consumption of neutralizing agent and, at the same time, the best neutralizing effect.

The apparatus of the present invention may further include an overflow device for adjusting the feed height to the compressed gas atomizer. This device is located between the processing plant for the suspension and the compressed gas atomizer. The transport of the suspension to the flue gas stream therefore takes place solely due to the feed height. This results in low velocities and low pressures in the lines through which the suspension travels which contributes to the reduction in wear. The overlfow device may, at the same time, have a return pass to the processing plant.

This makes it possible for the amount of suspension supplied to the overflow device to be at least twice that supplied to the compressed gas atomizer. As a result of this constant circulation, lime deposits, which can occur especially when using viscous suspensions, can be minimized or completely prevented.

For adjustment of the amount of suspension introduced into the flue gas stream, the overflow means is equipped with a height adjustment means which allows the height of the suspension level relative to the compressed gas atomizer to be varied. This, in turn, results in a corresponding change in the amount of suspension supplied to the atomizer means. The height adjustment may consist of a telescopically expanding and contracting overflow pipe with an electric servomotor. Other adjustment drives may, however, also be used.

Referring to the drawings, and particularly FIG. 1, FIG. 1 shows a process engineering flow diagram of equipment for neutralizing a flue gas stream in accordance with an embodiment of the present invention. Shown therein is a processor 1, which consists essentially of a vessel 2 containing calcium hydroxide and a storage tank 3 containing a suspension of calcium hydroxide and water. The calcium hydroxide is delivered into the storage tank 3 with a motor (M) driven screw conveyor 4, while a water feed pipe 5 is provided for the water. The water feed pipe 5 is controlled by a float 6 and, in addition, connected via a control circuit 7 with the screw conveyor which cooperate to maintain the composition of the suspension constant.

Although the example of the operation shown works preferably with a mixing ratio of 1:4, the equipment can be easily set to any mixing ratio of interest. In addition, a stirrer 8 which dips into the suspension is provided.

From processor 1, the suspension is pumped by means of a motor (M) driven pump 9 via supply line 10 to an overflow facility 11 which consists of a vessel 12 with an overflow pipe 13 which is mounted in vessel 12. The excess suspension supplied can flow back to the storage tank 3 through openings in the overflow pipe 13 as well as through a drain pipe 14. Since the pump 9 always delivers substantially more than the required amount, e.g., more than twice the required amount, a circulation comes into being which, on the one hand, keeps the level of the suspension constant in the overflow facility 11 according to the height of the openings in the overflow pipe 13 and, on the other, ensures that no lime deposits develop in the system.

The height of the overflow pipe 13 can be adjusted telescopically so that the height of the suspension can be adjusted or varied. In the example shown, this is accomplished by means of an electric servomotor 15 which is connected through a crank 16, a tie rod 17, a double lever 18 as well as an additional tie rod 19 with the upper end of the overflow pipe 13.

From the overflow facility 11, the feed line 10 continues to the atomizing device 20 of a compressed air atomizer 21. In addition to the atomizing device 20, this compressed air atomizer 21 has a pressure producing plant which consists of a motor (M) driven compressor 23, a compressed air tank 24 and a heater 25 connected in series. An automatic control system 26 is interposed between the compressor 23 and the compressed air tank 24, in order to ensure a largely constant filling of the compressed air tank 24.

From the pressure producing plant 22, the compressed air connects with the atomizing device 20 through the compressed air line 27. This atomizing device is mounted in the wall 29 of a flue gas channel 30 by means of a ball-and-socket joint 28 and its outlet end 31 extends into approximately the center of the channel 30. In so doing, the outlet or suspension delivery end 31 is positioned lower than the level of the suspension in overflow facility 11 so that there exists a feed height differential between the two. This serves to effect transport of the suspension from overflow facility 11 through feed line 10 and its emergence from the outlet end 31 of the atomizing device 20. By changing the level of the suspension in the overflow facility 11, the feed height differential, and therefore the amount of suspension emerging at the atomizing device 20 can be changed as desired.

The compressed air emerges through a U-shaped section of line 32 the exit of which is positioned at a right angle to the direction of the exiting suspension which thus effects atomization of the suspension in the direction of the flue gas stream. The amount of compressed air emerging can be set through a valve 34 which is equipeed with an adjusting motor 33.

The adjustment of the level of the suspension and, therefore, of the amount of suspension emerging into the flue gas stream as well as the adjustment of valve 34, and, therefore, of the amount of atomizing air emerging, is accomplished automatically through a control system. This control system receives information concerning the amount of flue gas from facility 35, which measures the amount of flue gas and which is mounted as a Venturi jet in the flue gas channel 30. Facility 35 also receives information from a probe 36 equipped with an analyzer, which extends into the flue gas channel 30 so that the concentration of pollutants can be determined proportionally to the amount of flue gas.

The signal generated by facility 35 for measuring the amount of flue gas is used as a control parameter through control means 37 to control valve 34. This control operates so that as the amount of flue gas increases, the amount of compressed air also increases. At the same time, the signal is passed on to a further control means 38 to which servomotor 15 of overflow facility 11 is connected and which effects a corresponding increase in the amount of suspension. At the same time, the ratio of the amount of compressed air to the amount of suspension remains constant. If only the concentration of pollutants changes, the signal generated by probe 36 is sent to control means 38 and from this to servomotor 15. In this case, only the level of the suspension and therefore the amount of suspension to be atomized is then changed, while the amount of compressed air remains constant.

If the amount of flue gas as well as the concentration of pollutants vary, the changes in the amount of compressed air and the amount of suspension no longer proceed proportionally. The signal coming from facility 35 for measuring the amount of flue gas is amplified or correspondingly weakened depending on the amount of suspension, by the signal received from control means 38 from probe 36, so that the amount of suspension is varied more than the amount of compressed air.

In other respects, there is one measuring site 39, 40, 41, each in the compressed air line 27, as well as in feed line 10 and outlet line 14, whose data is converted into signals and returned to the corresponding control means 37, 38 as remote control information.

If required, branches of the feed line 10 or of the compressed air line 27 may be connected to processing plant 1 and pressure producing plant 2 in order to supply compressed air to additional atomizing devices. This is indicated in FIG. 1 with lines 42.

Figure 2:
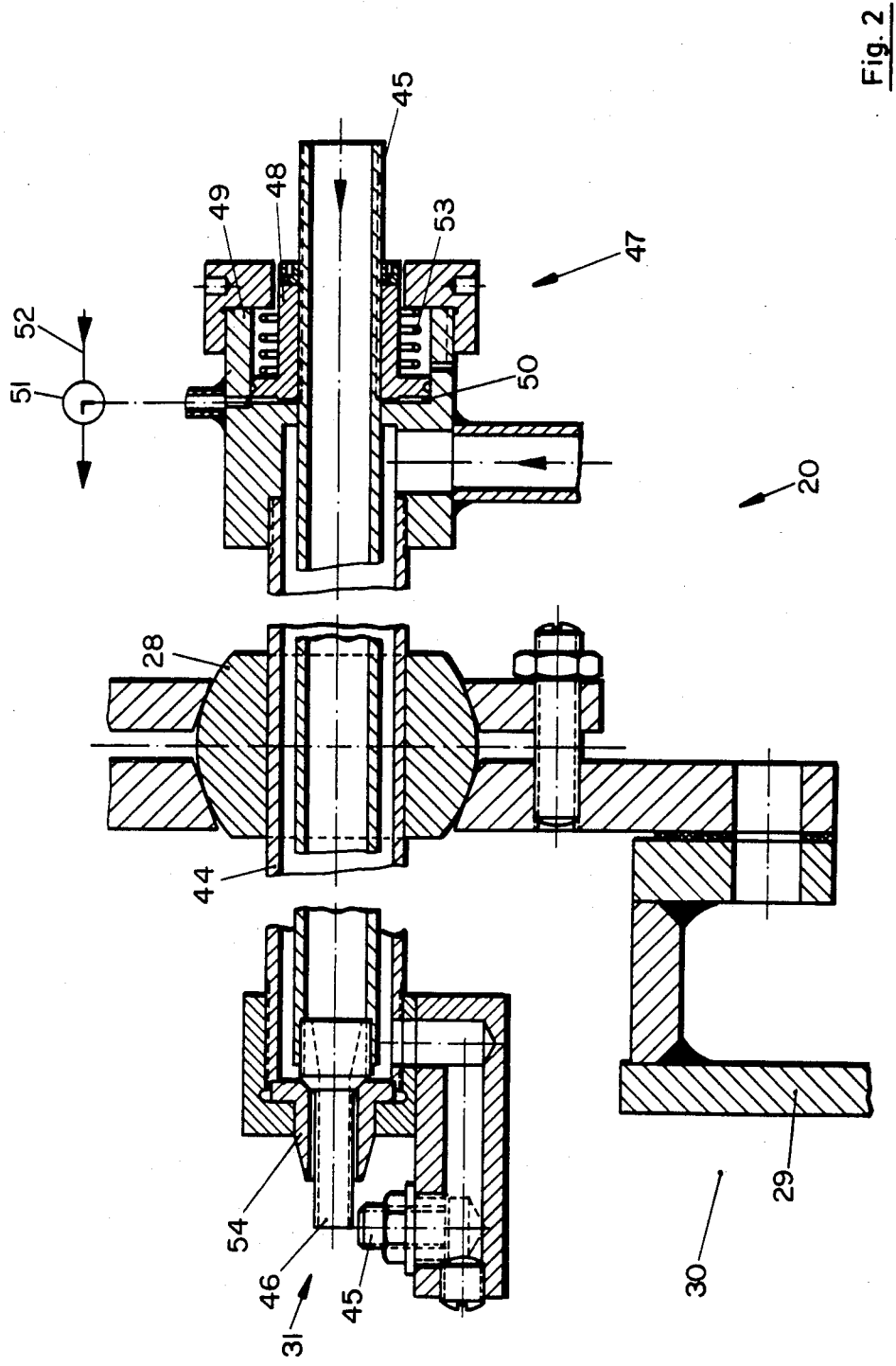
FIG. 2 shows a cross section of an atomizing organ of the equipment according to FIG. 1.

FIG. 2 shows a cross-section through atomizing device 20. This has a feed pipe 43 through which the suspension can run in the direction of outlet end 31. This feed pipe 43 is surrounded concentrically by a jacket pipe 44 which is connected at one end with compressed air line 27 and at the other with the U-shaped section of line 32 and is used for the transport of compressed air. The discharge 45 of this section of line 32 is arranged below and at right angles to the discharge 46 of the feed pipe 43, so that the compressed air, flowing out of the section of line 32, carries the suspension out of feed pipe 43 and at the same time, atomizes it into a finely divided state.

Feed pipe 43 is guided in the jacket pipe 44 so as to be displacable in the axial direction. For the axial motion, an actuating device 47 with an actuating piston 48 is provided which is bolted together with the feed pipe 43 and runs in a cylinder 49. On the left side of cylinder 49, a pressure space 50 is provided which is connected with a two-way magnetic valve 51, which is used for controlling the application of pressure by the pressure medium on the pressure space and therefore, on the actuating piston 48. At the same time, the pressure medium line 52 which leads to the two-way magnetic valve, may be connected to the compressed air line.

By periodically reversing the two-way magnetic valve, the pressure space 50 can be pressurized or depressurized so that the piston is pushed to the right and, after depressurization, back to the left by spring 53. By these means, the protruding free end of the feed pipe 43 is retracted so that the wiper ring 54, which is mounted there, can wipe off any deposited residues of lime and dust and so keep the discharge outlet 46 constantly clean. The jacket space of the coaxially arranged feed pipe, which is under the same pressure as the atomizer, in conjunction with the ample tolerance of the free end, ensure that the material wiped off is blown away.

The unit, consisting of feed pipe 43 and jacket pipe 44, is mounted adjustably through a ball-and-socket joint 28 in the wall 29 of flue gas channel 30 so that the position of the atomizing device 20 can be adjusted depending on the existing conditions of the flue gas flow.

Figure 3:
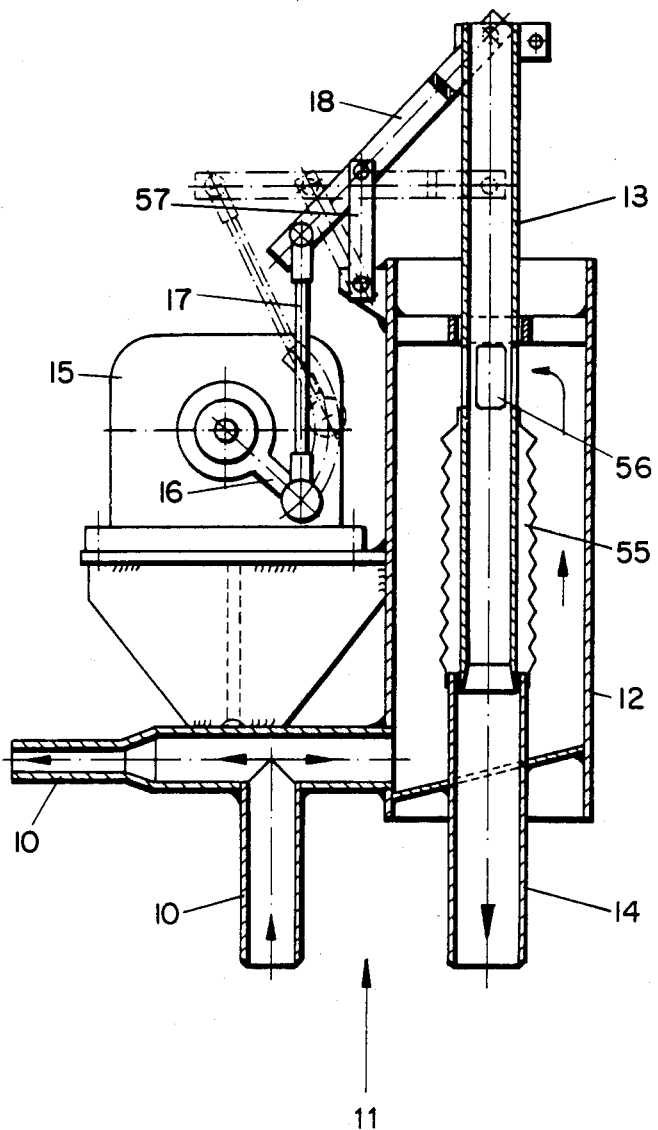
FIG. 3 shows a cross-section of an overflow facility for the equipment of FIG. 1.

FIG. 3 also shows a cross section of the overflow facility 11 with vessel 12, overflow pipe 13 and servomotor 15, but drawn on a larger scale. The overflow pipe 13 has a lesser diameter than the discharge pipe 14 to which its lower end is connected so that the two pipes can be telescoped into and out of one another. If required, the junction between the two pipes can be additionally sealed by flexible bellows 55. Above the bellows 55, the overflow pipe 13 has several overflow openings 56 whose lower edge determines the height of the suspension level.

The upper end of the overflow pipe 13 is connected flexibly with the double lever 18. In contrast to the representation in FIG. 1, the tie rod 19 is omitted here. This function is fulfilled here by the double lever 18 which is pivoted for this purpose at rocker plate 57 which is mounted on vessel 12. The lower end of the double lever 18 is connected through tie rod 17 with crank 16 which is seated on servomotor 16.

In the position shown by solid lines, the overflow pipe 13 is in the highest position, that is, the height differential between the lower edge of opening 56 and atomizing device 20 shown in Figue 1, and therefore, the amount of suspension flowing to atomizing device 20 is greatest in this position. By turning crank 16 counterclockwise, the rod linkage assumes the position shown by the dashed lines in which the overflow pipe 13 is pushed into discharge pipe 14. The level of the suspension falls correspondingly so that the flow to the atomizing device 20 decreases.

Figure 4:
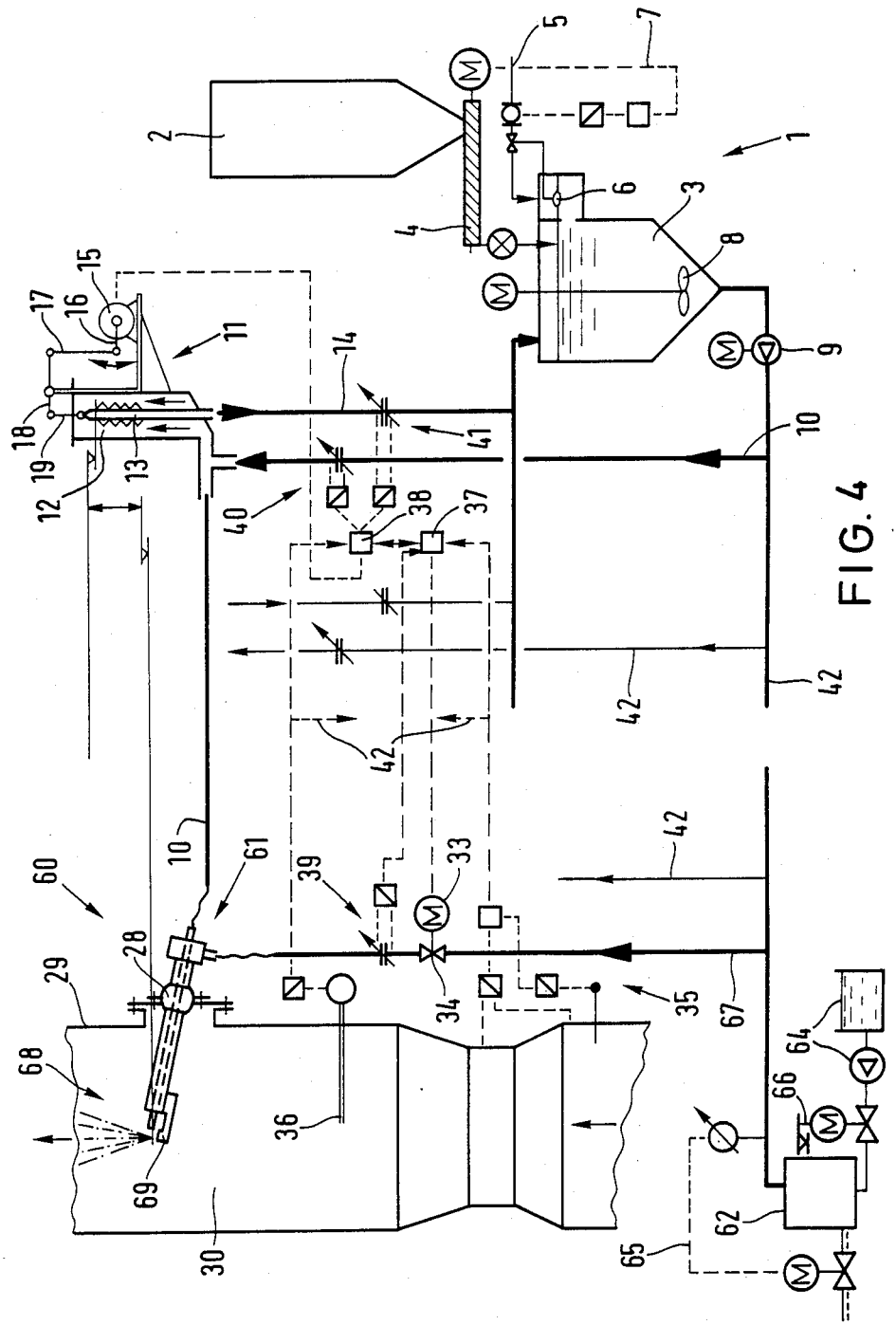
FIG. 4 shows a process engineering flow diagram of equipment for neutralizing pollutants in flue gases in which steam is used as atomizing agent and calcium hydroxide as neutralizing agent.

FIG. 4 shows a process engineering flow diagram of equipment for neutralizing a flue gas stream. In its function, the equipment is identical with that described in FIG. 1 and differs in construction and fittings only in that steam is used as the atomizing agent instead of compressed air.

From the overflow facility 11, feed pipe 10 continues to the atomizing device 60 of a steam atomizer 61. In addition to the atomizing device 60, this steam atomizer has a steam producing plant which consists of a boiler 62 for producing saturated steam or slightly superheated steam by appropriate heating means (not shown) on the water inlet side, the heating being controlled by the steam pressure. Also included are the appropriate water processing and water supply equipment 64. The automatic control system for the inlet pressure 65 as well as the automatic control system for the water supply 66 of the boiler makes the operation largely automatic, within the limits of the legal regulations. From the pressure producing plant 62, the steam passes through steam line 67 to the atomizing device 60 which is mounted by means of a ball-and-socket joint 28 in the wall 29 of a flue gas channel 30 and whose discharge end 68 protrudes approximately to the center of the flue gas channel. In so doing, the discharge end 68 lies lower than the level of the suspension in the overflow device 11, so that there exists a feed height differential between the two. This effects the transport of suspension through feed pipe 10 and the emergence of the suspension at the discharge end 68 of the atomizing device 20 in the manner described hereinabove. By altering the level of the suspension in the overflow facility 11, the feed pipe, and therefore, the amount of suspension emerging at the atomizing device 60 can be changed.

The steam itself emerges through a U-shaped section of line 69 at right angles to the suspension which is atomized in the process in the direction of the flue gas stream. The amount of steam emerging can be adjusted with a valve 34, which is equipped with a servomotor 33.

The adjustment of the level of the suspension and therefore of the amount of suspension emerging into the flue gas stream as well as the adjustment of the valve 34 and therefore, of the amount of atomizing steam emerging, is accomplished automatically through a control system similar to that described in the explanation of the example of the operation shown in FIG. 1.

Depending on the need, branches of the feed line 10 or of the steam line 67 may be connected to the processing plant 1 and the pressure producing plant 62 in order to take care of additional atomizing devices. This is indicated here by lines 42.

FIG. 5 shows a cross-section through the atomizing device 60. Atomizing device 60 has a feed pipe 43 through which the suspension flows toward the discharge end 68. This feed pipe 43 is concentrically surrounded by jacket pipe 44 whose task is to shield the atomizer against the effects of heat and, on the other hand, to prevent the condensation of atomizing steam on the cold feed pipe 43. Feed pipe 43 and jacket pipe 44 are surrounded concentrically by a further jacket pipe 70. This jacket pipe 70 connects steam line 67 with the U-shaped section of line 69 and therefore, serves for the transport of the steam. The steam conducting jacket pipe 70 is protected against contact by a protective jacket 72 of corrosion resistant sheet metal. The outlet 45 of this section of line 69 is arranged below and at right angles to outlet 46 of feed pipe 43, so that the steam, flowing out of the section of line 69, carries along and disperses the suspension coming from the feed pipe 43 into a finely divided state.

Feed pipe 43 is guided in jacket pipe 44 so as to be axially displacable. For the axial motion, an actuating device 47 with an actuating piston 48 is provided which is bolted together with feed pipe 43 and runs in a cylinder 49. A pressure space 50 is provided on the left side of cylinder 49 which is connected with a two-way magnetic valve 51. This is used for controlling the application of pressure by the pressure medium on presssure space 50 and, therefore, on actuating piston 48. At the same time, the pressure medium line 52 which leads to the two-way magnetic valve may be connected to the steam line 67. The function of this axial displacement equipment as a cleaning mechanism is similar to that described in connection with the example of the operation shown in FIG. 1.

In order to reinforce the heat protection effect for the feed pipe 43, the space between feed pipe 43 and jacket pipe 44 is provided with air supply boreholes (not shown) and an amply dimensioned air gap 74 on the flue gas channel side. The lower pressure existing in the flue gas channel provides for the transport of cold air from the outside through boreholes past feed pipe 43 into the flue gas channel, the air having a corresponding cooling effect.

What is claimed is:

1. An apparatus for neutralizing acidic pollutants in flue gas contained in a fluie gas channel comprising:
    a flue gas channel for containing a flue gas;
    a suspension feed pipe having a delivery opening and being connected to means for preparing and maintaining an erosive suspension of a finely divided basically reaction solid in a liquid for introducing suspension as such into the flue gas channel;
    a compressed gas pipe connected to a compressed gas source and having a gas discharge opening, said discharge opening being positioned relative to the delivery opening to discharge gas so as to atomize the suspension after it has exited the delivery opening;
    means for determining the amount of flue gas flowing through the channel and the amount of pollutants therein; and
    means for simultaneously and separately controlling the amount of suspension introduced and the concentration of said suspension and the amount of compressed gas used depending on the determined amount of flue gas, pollutants, or flue gas and Pollutants in the flue gas channel.

2. The apparatus of claim 1 wherein said gas pipe surrounds said feed pipe.

3. The apparatus of claim 2 wherein the gas pipe terminates in a U-shaped portion having the gas discharge opening therein.

4. The apparatus of claim 2 wherein said gas pipe is mounted in said channel with a ball-and-socket mounting.

5. The apparatus of claim 7 wherein the feed pipe is surrounded by a wiper ring in the vicinity of the delivery opening, said pipe being positioned so as to be movable axially within said ring wherein said ring and axial movement serve to remove residue build-up from the delivery opening.

6. The apparatus of claim 5 which further comprises means for actuating axial movement of the feed pipe using compressed gas, said means being connected to the compressed gas source.

7. The apparatus of claim 1 wherein said feed pipe has means for removing build-up residue from the delivery opening.

8. The apparatus of claim 1 having means for heating the compressed gas.

9. The apparatus of claim 1 wherein said control means includes means for separately altering the mount of compressed gas and altering the amount of suspension such that as the amount of flue gas varies, both the amounts of compressed gas and suspension vary correspondingly and when the concentration of pollutants varies, only the amount of the suspension varies correspondingly, and as the amounts of flue gas and pollutants vary, the amount of compressed gas varies corresondingly.

10. The apparatus of claim 1 wherein the compressed gas pipe is positioned so as to discharge gas in a stream perpendicular to the delivery opening.

11. The apparatus of claim 1 which further comprises an overflow chamber; means for introducing suspension to the chamber from the preparation and maintenance means; means for delivering overflow suspension in the chamber to the feed pipe; means for recycling suspension between said overflow chamber and the preparation and maintenance means; means for supplying to said overflow chamber at least twice the amount of suspension as supplied to said feed pipe; and means for adjusting the amount of overflow from said overflow chamber to said feed pipe.

12. The apparatus of claim 11 wherein said adjustment means is a vertically extendable overflow pipe within said chamber.

13. The apparatus of claim 12 wherein the overflow chamber is positioned so as to achieve gravity flow of the overflowing suspension to said feed pipe.

* * * * *